United States Patent
Demonte et al.

(10) Patent No.: US 9,854,190 B2
(45) Date of Patent: Dec. 26, 2017

(54) IMAGING SYSTEMS AND METHODS FOR TRANSIENT SIGNAL INTEGRITY VERIFICATION

(71) Applicant: SEMICONDUCTOR COMPONENTS INDUSTRIES, LLC, Phoenix, AZ (US)

(72) Inventors: Frank James Demonte, Corvallis, OR (US); Cornelis Daniel Hoekstra, Corvallis, OR (US); Raymond Allen Davis, Salem, OR (US); Ray Alan Mentzer, Corvallis, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 133 days.

(21) Appl. No.: 14/667,436

(22) Filed: Mar. 24, 2015

(65) Prior Publication Data
US 2016/0286145 A1  Sep. 29, 2016

(51) Int. Cl.
H04N 5/369 (2011.01)
H04N 5/378 (2011.01)
H04N 5/3745 (2011.01)

(52) U.S. Cl.
CPC ........ *H04N 5/3698* (2013.01); *H04N 5/378* (2013.01); *H04N 5/37455* (2013.01)

(58) Field of Classification Search
CPC ... H04N 5/3698; H04N 5/37455; H04N 5/378
See application file for complete search history.

(56) References Cited

U.S. PATENT DOCUMENTS

| | | | |
|---|---|---|---|
| 7,102,305 B2 | 9/2006 | Suzuki | |
| 7,521,988 B2 | 4/2009 | Shin | |
| 2002/0060917 A1 | 5/2002 | Tanimoto | |
| 2002/0145672 A1* | 10/2002 | Mentzer | H04N 5/2176 348/246 |
| 2004/0196397 A1* | 10/2004 | Beck | H04N 3/155 348/308 |
| 2006/0082669 A1* | 4/2006 | Inoue | H01L 27/14632 348/308 |
| 2007/0229677 A1* | 10/2007 | Mochizuki | H03M 1/0682 348/229.1 |
| 2009/0051414 A1 | 2/2009 | Pahr | |

\* cited by examiner

*Primary Examiner* — Michael Teitelbaum
(74) *Attorney, Agent, or Firm* — Treyz Law Group, P.C.; Joseph F. Guihan (57) ABSTRACT

An image sensor with an array of pixels is provided. In order to determine failure of transient signal generation circuitry within the image sensor, monitoring circuitry may be used to capture and adjust transient signals as the signals are being transmitted. The transient signals may be voltage booster signals that are generated by booster circuitry to adjust row control signal levels to be below the ground reference voltage or above the supply reference voltage before providing them to the array of image sensor pixels. The captured and adjusted transient signals may be multiplexed and transmitted through a common buffer circuit. The method of shifting/adjusting the captured voltages may also apply to static signals. The multiplexed adjusted signals may be converted from digital signals to analog signals with digital-to-analog conversion circuitry. The digitized signals may be transmitted to host circuitry for processing which may include pass/fail testing.

18 Claims, 5 Drawing Sheets

IMAGING SYSTEMS AND METHODS FOR TRANSIENT SIGNAL INTEGRITY VERIFICATION

BACKGROUND

This relates generally to image sensors, and more specifically, to the capture and adjustment of transient signals within image sensors, particularly those below the ground reference voltage or above the supply voltage.

Image sensors are commonly used in electronic devices such as cellular telephones, cameras, and computers to capture images. In a typical arrangement, an electronic device with an image sensor is provided with an array of image sensor pixels arranged in pixel rows and columns. Column sensing circuitry is typically coupled to each pixel column for reading out image signals from the image pixels.

Conventional image sensors often perform imaging by amplifying pixel control signals using a voltage boost which adjusts the original signal either below the ground reference voltage or above the operating voltage supply of the image sensor. The voltage boost is typically provided by one or more pixel control circuits coupled to the image sensor pixel array.

In practice, if one of the pixel control circuits that provides the voltage boost were to fail or have degraded performance, there would be no indication of the failure other than resultant dim or low dynamic range and image artifacts in the final image produced by the image sensor. In some applications where the quality of a produced image may affect the safety of the device or the user, such an unexpected failure or degradation in sensor performance could be catastrophic.

It would therefore be desirable to be able to provide imaging systems and methods with improved capabilities for monitoring and verifying the integrity of transient voltage signals in the image sensor in real-time.

DETAILED DESCRIPTION

Embodiments of the present invention relate to image sensors, and more particularly to the capture and adjustment of transient signals within image sensors. It will be recognized by one skilled in the art, that the present exemplary embodiments may be practiced without some or all of these specific details. In other instances, well-known operations have not been described in detail in order not to unnecessarily obscure the present embodiments.

Figure 1:
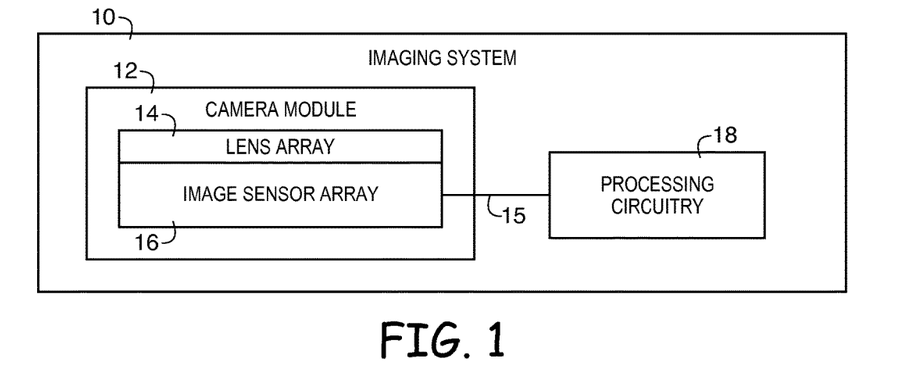
FIG. 1 is a diagram of an illustrative electronic device in accordance with an embodiment of the present invention.

FIG. 1 is a diagram of an illustrative electronic device in accordance with an embodiment of the present invention. As shown in FIG. 1, imaging system 10 may be a portable imaging system such as a camera, automotive imaging system, cellular telephone, video camera, video surveillance system, or any other desired imaging device that captures digital image data. System 10 may include a camera module 12 that is used to convert incoming light into digital image data. Camera module 12 may include an array of lenses 14 and a corresponding image sensor array 16. Lens array 14 and image sensor array 16 may be mounted in a common package and may provide image data to processing circuitry 18. Image sensor array 16 may include one or more image sensors and lens array 14 may include one or more corresponding lenses.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensor array 16 or an integrated circuit within module 12 that is associated with image sensor array 16). Image data that has been captured and processed by camera module 12 may, if desired, be further processed and stored using processing circuitry 18. Processed image data may, if desired, be provided to external equipment (e.g., a computer or other device) using wired and/or wireless communications paths coupled to processing circuitry 18.

Image sensor array 16 may contain an array of individual image sensors configured to receive light of a given color by providing each image sensor with a color filter. The color filters that are used for image sensor pixel arrays in the image sensors may, for example, be red filters, blue filters, and green filters. Each filter may form a color filter layer that covers the image sensor pixel array of a respective image sensor in the array. Other filters such as white color filters, dual-band IR cutoff filters (e.g., filters that allow visible light and a range of infrared light emitted by LED lights), etc. may also be used.

Figure 2:
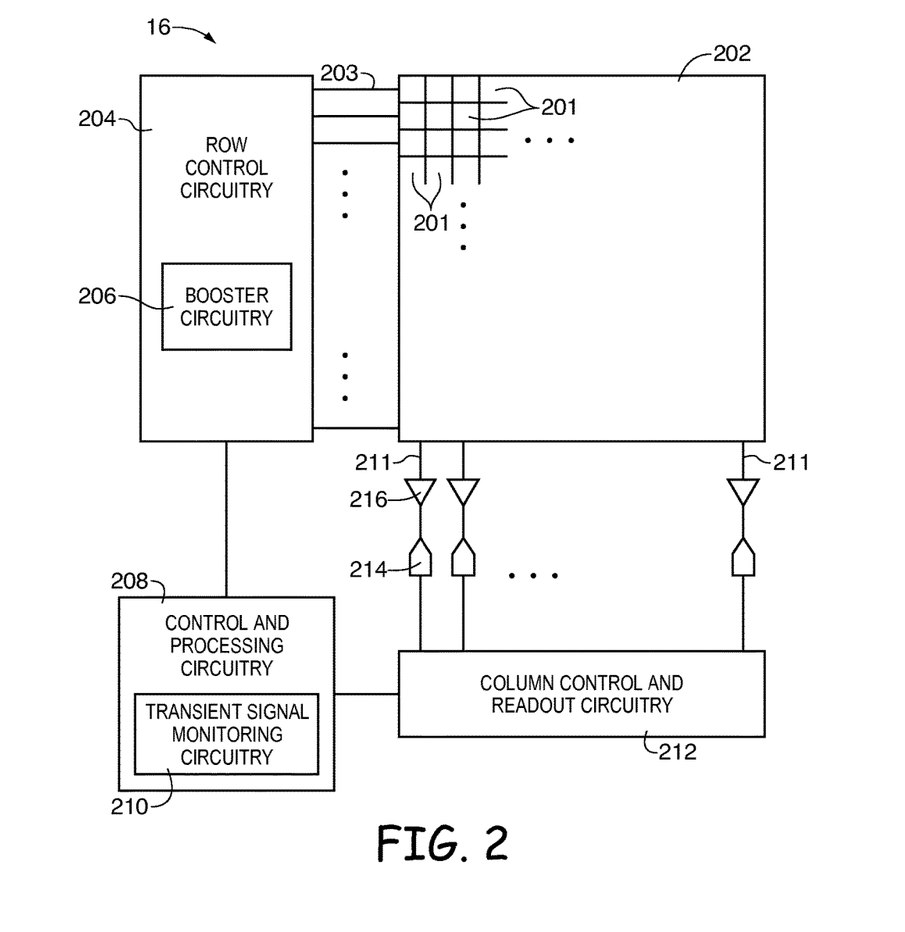
FIG. 2 is a diagram of an illustrative image pixel array in an image sensor that is controlled by row control circuitry having voltage booster control circuitry and that includes control and processing circuitry with transient signal monitoring capabilities in accordance with an embodiment of the present invention.

FIG. 2 is a diagram of an illustrative image pixel array in an image sensor having row control circuitry with voltage boosting capabilities and transient signal monitoring circuitry for verifying the performance of the image sensor. The term "boost" and its derivatives are used throughout this specification to indicate a voltage or a generation of a voltage which is lower than the ground reference or higher than the operating voltage supply. As shown in FIG. 2, the image sensor (e.g., image sensor 16 of FIG. 1) may include pixel array 202 having multiple pixels 201 (sometimes referred to herein as image pixels 201 or image sensor pixels 201) and row control circuitry 204 that is coupled to image pixel array 202. Row control circuitry 204 may provide pixel control signals (e.g., row select signals, pixel reset signals, charge transfer signals, etc.) to pixels 201 over corresponding row control lines 203 to control the capture and read out of images using image sensor pixels in array 202.

Row control circuitry 204 may include voltage booster circuitry 206 (sometimes referred to herein as voltage boosting circuitry 206, boosting circuitry 206, or booster circuitry 206) for providing pixel control signals generated at control circuitry 204 with a boosted voltage magnitude. Image sensor 16 may include column control and readout circuitry 212 and control and processing circuitry 208 that is coupled to row control circuitry 204 and column circuitry 212. Column control circuitry 212 may be coupled to array 202 via multiple column lines 211 (e.g., each column of pixels 201 in array 202). A corresponding analog-to-digital converter (ADC) 214 and column amplifier 216 may be interposed on each column line 211 for amplifying analog signals captured by array 202 and converting the captured analog signals to corresponding digital pixel data. Column control and readout circuitry 212 may be coupled to external hardware such as processing circuitry. Column control and readout circuitry 212 may perform column readout based on signals received from control and processing circuitry 208. Column control and readout circuitry 212 may include column ADC circuits 214 and column amplifiers 216.

In practice, it may be desirable to provide pixel control signals to array 202 with a boosted voltage magnitude (e.g. in order to increase pixel performance by improving dynamic voltage range of the pixel). If desired, booster circuitry 206 may provide signals (e.g., pixel control signals) generated at row control circuitry 204 with a desired voltage boost to generate corresponding boosted signals (e.g., boosted row control signals such as boosted charge transfer signals, boosted row select signals, boosted reset signals, etc.). For example, a system with a supply voltage of 3.5V may contain a signal having a typical voltage of 2.8V which can then be boosted to 4.5V in order to have a greater voltage magnitude than the supply voltage. In another example, a system may contain a signal being held at a ground reference voltage of 0V, which can then be boosted to −1V (e.g. in order to reduce current leakage and maximize full well capacity of photodiodes in low light conditions). The boosted signals (sometimes referred to herein as booster signals) may be provided to control circuitry for each row of image pixel array 202. It is useful for signals generated by the control circuitry to have a greater magnitude than the supply voltage because it increases the dynamic range of the pixel. By increasing the dynamic range of the pixel, image quality can be increased in certain conditions such as when an image is captured in a low light environment. Other row signals, such as a charge transfer signal, may be boosted below the ground reference voltage level to minimize charge leakage and maximize full well capacity under low light conditions.

A transient signal may be characterized as any signal that is switched from one value to another in a non-periodic way. In particular, a signal is said to contain a transient whenever its Fourier expansion requires an infinite number of sinusoids. Conversely, any signal that may be expressed as a finite number of sinusoids can be defined as a steady-state signal. Image sensor array 16 may implement (e.g., produce and use) multiple different transient signals. For example, in order to ensure accurate analog-to-digital conversion, transient reference voltage signals may be provided to ADC 214. Pixel control signals generated by booster circuitry 206 are another example of transient signals within image sensor array 16. Because of the impact of transient signals on critical system functions (e.g. conversion accuracy and pixel dynamic range), it may be desirable to determine (e.g., verify) the quality of these signals by capturing and measuring the transient signals (e.g., through an indirect measurement). Such quality verification may be performed by the sensor to verify satisfactory performance of one or more components of the sensor (e.g., based on the transient signals implemented by the image sensor). By performing indirect measurements (e.g. through a buffer circuit) on transient signals as opposed to direct measurements, the integrity of the measured signal may be maintained. Because each transient signal may only exist for a short amount of time, it is necessary to capture and store the signal as it is transmitted so that the transient signals may be measured to verify satisfactory system performance.

Transient signals such as boosted signals generated by booster circuitry 206 may be provided to transient signal monitoring circuitry 210. Monitoring circuitry 210 may capture and store boosted signals generated by booster circuitry 206. Monitoring circuitry 210 may capture and store the boosted signals without adding noise or changing the characteristics of the boosted signal (e.g., without interrupting or degrading use of the transient signals for performing other device functions of image sensor 16). Transient signal monitoring circuitry 210 may include circuitry for shifting and/or compressing the voltage level of each booster signal so that the adjusted signal is within an allowable voltage range (e.g., an allowable voltage range for signals that are provided to an ADC such as ADC 214 or dedicated ADC circuitry within circuitry 208). The output of transient signal monitoring circuitry 210 may be coupled to ADC 214 or any other desired ADC circuitry. The ADC circuitry used to convert the captured transient signals may only be operable within a certain voltage range which may require the voltage level of signals received by the ADC circuitry to be shifted and/or compressed so that the transient signals have a voltage within the required voltage range.

Amplifier 216 may be configured to receive analog signals (e.g., analog reset or image level signals) from pixel array 202 and to amplify the analog signals. The analog signals may include data from a single column of pixels or from multiple columns of pixels, depending on the application. ADC 214 may receive amplified analog signals from amplifier 216 and may perform analog-to-digital conversion operations on the analog signals before to generate digital data. The digital data may be transmitted to column control and readout circuitry 212 for processing and readout. If desired, ADC 214 may be configured to receive additional analog signals from transient signal monitoring circuitry 210 and may perform analog-to-digital conversion operations on the received signals before sending the signals to external host circuitry.

Figure 3:
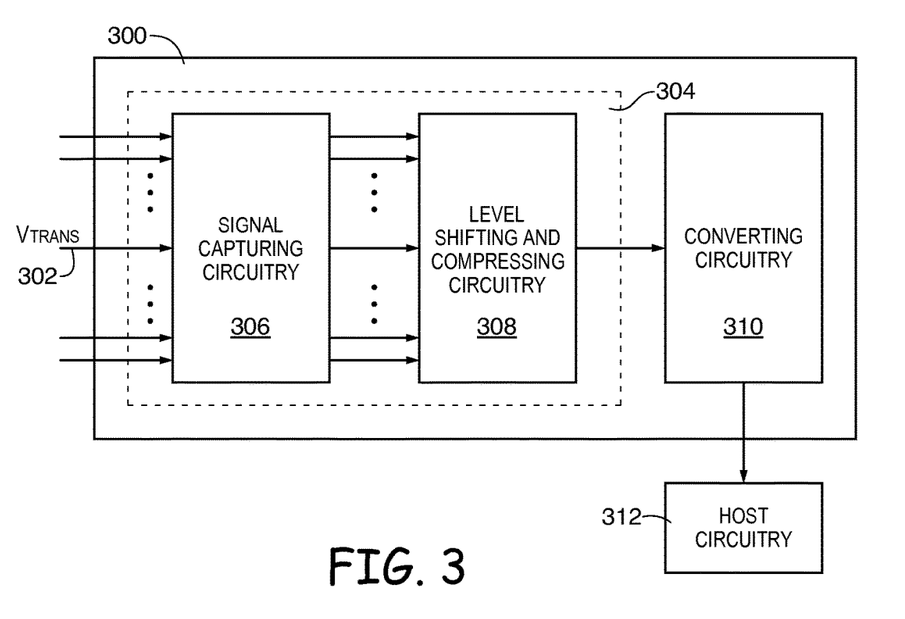
FIG. 3 is a block diagram of illustrative transient signal monitoring circuitry having transient signal capturing circuitry and level shifting and compressing circuitry for providing level shifted and/or compressed versions of captured transient signals to converting circuitry and host circuitry in accordance with an embodiment of the present invention.

FIG. 3 is a block diagram of an illustrative control and processing circuit with transient signal monitoring circuitry for capturing and storing transient signals and for performing level shifting and/or compression on the stored transient signals (e.g., for verifying satisfactory performance of image sensor 16). As shown in FIG. 3, control and processing circuitry 300 (e.g., control circuitry such as circuitry 208 of FIG. 2) may include transient signal monitoring circuitry 304 (e.g., monitoring circuitry 210 of FIG. 2) and data converting circuitry 310. Processing circuitry 300 may be coupled to host circuitry 312 through the output of converting circuitry 310 (e.g., host computing equipment formed in imaging system 10 or external to imaging system 10). Transient signal monitoring circuitry 304 may include signal capturing circuitry 306 and level shifting and compressing circuitry 308. Signal capturing circuitry 306 may receive one or more transient voltage signals $V_{TRANS}$ over paths 302 (e.g., over a corresponding line). Level shifting and compressing circuitry 308 may be coupled between signal capturing circuitry 306 and data converting circuitry 310. Transient voltage signals $V_{TRANS}$ may, for example, include boosted voltage signals generated by booster circuitry 206 (e.g., paths 302 may be coupled between booster circuitry 206 and monitoring circuitry 304) or any other desired transient signals in image sensor 16.

Signal capturing circuitry 306 may capture and store transient voltage $V_{TRANS}$ signals received over paths 302. Capturing circuitry 306 may receive control signals from control and processing circuitry 300 or any other desired control circuitry that control circuitry 306 to perform desired signal capture and storing operations and that instruct circuitry 306 to provide the stored signals to level shifting and compressing circuitry 308. For example, signals stored within signal capturing circuitry 306 may be transmitted to level shifting and compressing circuitry 308 when selectively activated in response to control signals received from the control circuitry.

Level shifting and compressing circuitry 308 may receive a one or more of the stored transient signals $V_{TRANS}$ from signal capturing circuitry 306. Level shifting and compressing circuitry 308 may perform level shifting on the voltage level of each of the received signals $V_{TRANS}$ by shifting the voltage level of the received signals $V_{TRANS}$ up or down by a desired amount. As an example, ADC 310 may have an operating range of 2V-5V and signals $V_{TRANS}$ may have magnitudes ranging from 1V to 3V. Circuitry 308 may be shift the magnitude of signals $V_{TRANS}$ up by 1.5V so that the magnitudes of signals $V_{TRANS}$ range from 2.5V to 4.5V within the operating range of ADC 310. If desired, circuitry 308 may perform compression operations (e.g., in addition to or alternatively to performing level shifting operations) to normalize the voltage level of each of the received signals $V_{TRANS}$ to within a desired voltage range. As an example, signals $V_{TRANS}$ may have magnitudes ranging from 1V to 6V and may be compressed by a factor of 0.4 using circuitry 308 so that the magnitudes of signals $V_{TRANS}$ range from 2.5V to 4.5V (e.g., within the operating range of ADC 310).

Level shifting and compressing circuitry 308 may, if desired, include multiple circuits that are each used to perform level shifting and/or compression operations on a corresponding one of the multiple transient signals $V_{TRANS}$ received from capturing circuitry 306. If desired, level shifting and compressing circuitry 308 may include multiplexing circuitry that selects a single signal $V_{TRANS}$ at any given time from the multiple level shifted/compressed signals and may provide the selected signal to converting circuitry 310. In order to prevent unacceptable loading from converting circuitry 310 to level shifting and compressing circuitry 308, the output of level shifting and compressing circuitry 308 may include a buffer circuit, for example.

Converting circuitry 310 may include one or more ADCs. ADCs in circuitry 310 may perform analog-to-digital conversion on signals received from level shifting and compressing circuitry 308 to convert the level adjusted transient signals $V_{TRANS}$ from analog to digital signals. ADCs 310 may be formed within circuitry 208 (FIG. 2), may be formed from one or more of column ADCs 214, and/or may include ADCs at any other desired location on sensor 16. The digitized signals may then be transmitted to host circuitry 312 for processing (e.g. pass/fail testing, etc.).

Figure 4:
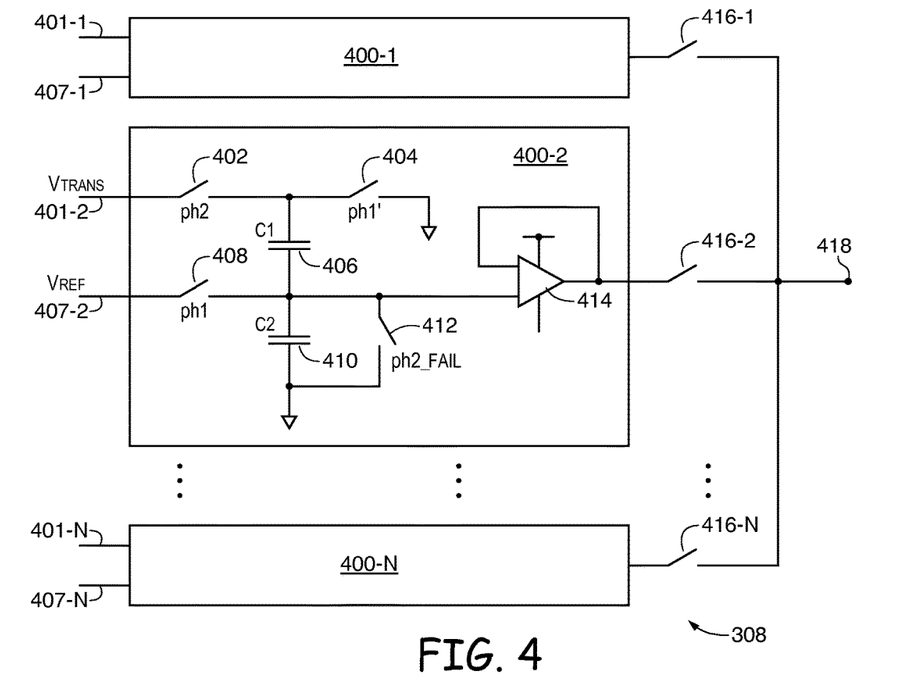
FIG. 4 is circuit diagram of illustrative level shifting and compressing circuitry of the type shown in FIG. 3 for providing captured transient signals with a desired magnitude in accordance with an embodiment of the present invention.

FIG. 4 is circuit diagram of illustrative level shifting and compressing circuitry for performing level shifting and/or compressing operations on transient signals. As shown in FIG. 4, level shifting and compressing circuitry 308 of FIG. 3 may include a number N of level shifting and compressing circuits 400. Each circuit 400 (e.g., a first circuit 400-1, a second circuit 400-2, a third circuit 400-3, etc.) may receive a corresponding transient voltage signal, $V_{TRANS}$ over inputs 401 (e.g., inputs 401 coupled to corresponding paths 302 through capturing circuitry 306) and a reference voltage signal $V_{REF}$ over inputs 407 (e.g., a first reference input 407-1, a second reference input 407-2, etc.). Multiplexing operations may be performed on the outputs of circuits 400 using switches 416 (e.g., a first switch 416-1, a second switch 416-2, etc.) to route each selected signal to output node 418. Output node 418 may be coupled to the input of data converting circuit 310 of FIG. 3.

Each circuit 400 may include a sampling pre-conditioning switch 408 controlled by control signal ph1, a delayed sampling pre-conditioning switch 404 controlled by control signal ph1', a sample enable switch 402 controlled by control signal ph2, a fail check enable switch 412 controlled by control signal ph2_FAIL, a first capacitor 406 having capacitance C1, a second capacitor 410 having capacitance C2, and a voltage buffer 414. This example is merely illustrative. In general, any desired components in any desired arrangement may be formed in each circuit 400 for performing level shifting and compression operations.

In the example of FIG. 4, in order to prepare circuit 400-2 to receive voltage signal $V_{TRANS}$ over 401-2, the circuit may undergo preconditioning to ensure the circuit is at a known state. For example, switch 404 may be interposed between ground on a first side and switch 402 and capacitor 406 on a second side of the switch. Switch 408 may be coupled between voltage signal input 407-2 and capacitor 406, capacitor 410, and switch 412. Circuit 400-2 may perform a preconditioning operation during which reference voltage $V_{REF}$ is applied to capacitors 406 and 410 in order to ensure that the circuit is at a known steady-state before the voltage signal $V_{TRANS}$ is applied. $V_{REF}$ may be selected from multiple possible values depending on the desired level shift to be applied. When circuit 400-2 is ready for preconditioning, switch 408 may be enabled (e.g., by asserting signal ph1) to allow capacitor 410 to begin charging or discharging. Then, after a time delay, switch 404 may be enabled (e.g., by asserting signal ph1') to allow capacitor 406 to begin charging or discharging. It may be desirable to allow circuit 400-2 to reach an equilibrium state before disabling switch 408 (e.g., by deasserting signal ph1) and switch 404 (e.g., by deasserting signal ph1').

Switch 402 may be coupled between voltage terminal 401-2, capacitor 406, and switch 404. Switch 402 may be configured to turn on upon assertion of an enable signal ph2 indicating that signal $V_{TRANS}$ is ready to be received over input 401-2. When switch 402 is turned on, circuit 400-2 may receive signal $V_{TRANS}$, compress $V_{TRANS}$ by a factor of $[C1/(C1+C2)]$, and shift the compressed signal by an amount equal to the magnitude of $V_{REF}$.

Switch 412 may be coupled to buffer circuit 414, switch 408, capacitor 406, and capacitor 410 on a first side of switch 412 and may be coupled to capacitor 410 and ground on a second side of switch 412. Fail checking operations may be performed to verify the operability of circuit 400-2. During a fail checking operation, switch 412 may be configured to turn on upon assertion of enable signal ph2_FAIL.

If the circuit 400-2 has not failed, the measured signal voltage will be ground. Otherwise, a failure may be indicated by the measurement of any non-ground value.

Figure 5:
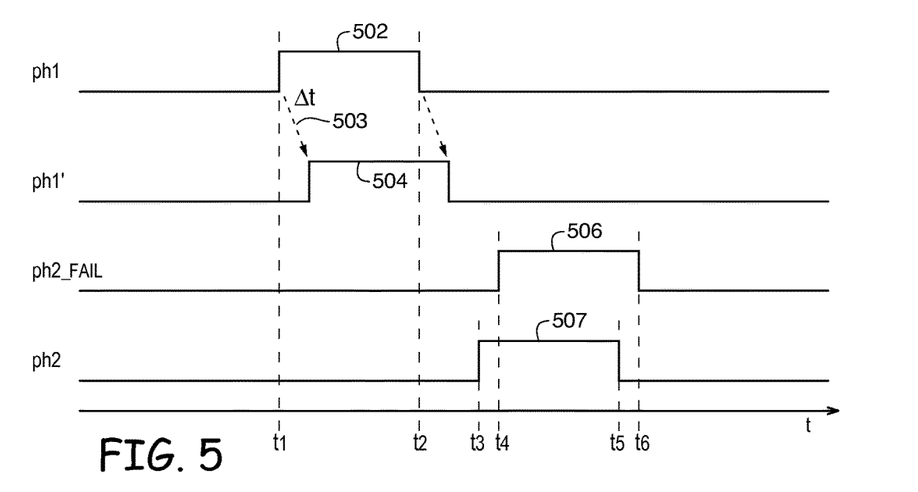
FIG. 5 is an illustrative timing diagram illustrating signal enablement associated with level shifting and compressing circuitry of the type shown in FIG. 4 in accordance with an embodiment of the present invention.

FIG. 5 is a timing diagram illustrating signal enablement associated with level shifting and compressing circuitry of the type shown in FIG. 4. As shown in FIG. 5, signal ph1 may be transmitted (e.g., by control circuitry) to a sampling pre-conditioning switch (e.g. 408 in FIG. 4). Signal ph1' may be transmitted to a delayed sampling pre-conditioning switch (e.g. 404 in FIG. 4). Signal ph2 may be transmitted to a sample enable switch (e.g. 402 in FIG. 4). Signal ph2_FAIL may be transmitted to a fail check enable switch (e.g. 412 in FIG. 4).

Signal ph1 may be enabled (asserted or pulsed high) in order to set a corresponding level shifting and compressing circuit (e.g. 400-2 in FIG. 4) to a known steady state and to charge first and second capacitors (e.g. 410 and 406 in FIG. 4) with a reference voltage (e.g. $V_{REF}$ in FIG. 4) for level shifting purposes. Signal ph1 may have a pulse 502 with a rising edge at time $t_1$ and a falling edge at time $t_2$ (e.g., signal ph1 may be asserted from time $1_1$ to time $t_2$). Signal ph1' may be a delayed version of signal ph1 502 that is transmitted from delay circuitry to a delay sampling pre-conditioning switch with a delay $\Delta t$ after time $t_1$. Signal ph1' have a pulse 504 with a rising edge at time $(t_1+\Delta t)$ and a falling edge at time $(t_2+\Delta t)$ (e.g. signal ph1' may be asserted from time $(t_1+\Delta t)$ to time $(t_2+\Delta t)$). By introducing the delay between signal ph1 and signal ph1', the first capacitor is charged individually for a period from $t_1$ to $(t_1+\Delta t)$, then both capacitors are charged for a period $(t_1+\Delta t)$ to $t_2$, and the second capacitor is charged for a period from $t_2$ to $(t_2+\Delta t)$. Signal ph2_FAIL may have a pulse 506 with a rising edge at time $t_4$ and a falling edge at time $t_6$ (e.g. signal ph2_FAIL may be asserted from time $t_4$ to time $t_6$). Signal ph2 may have a pulse 507 with a rising edge at time $t_3$ and a falling edge at time $t_5$ (e.g. signal ph2 may be asserted from time $t_3$ to time $t_5$).

Figure 6:
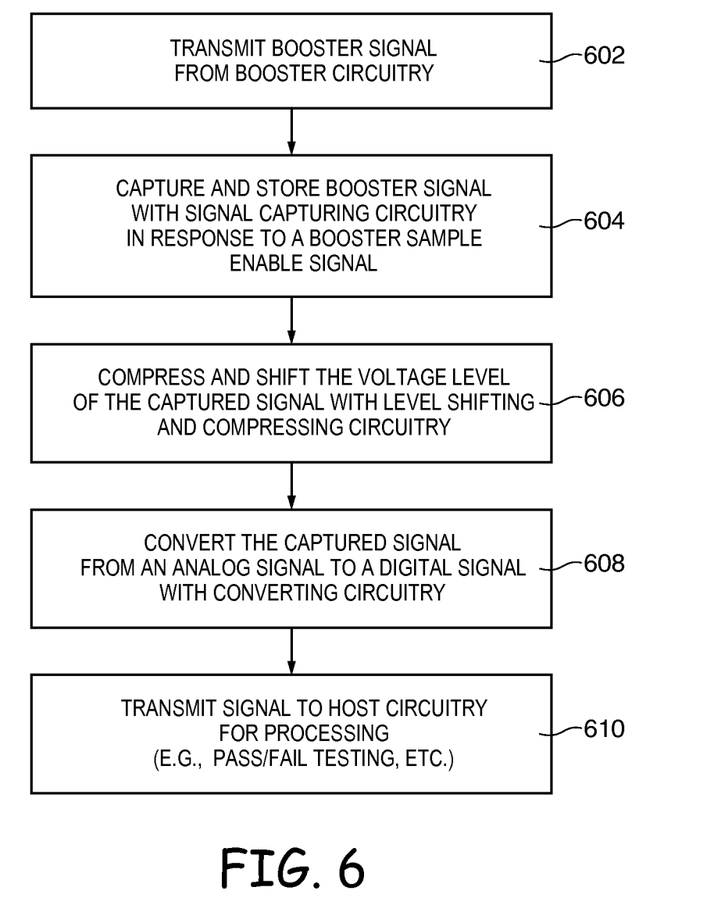
FIG. 6 is a flowchart of illustrative steps that may be performed by transient signal monitoring circuitry for capturing and adjusting transient image sensor signals such as booster signals in accordance with an embodiment of the present invention.

FIG. 6 is a flowchart of the illustrative steps that may be performed by image sensor 16 to capture and adjust boosted signals generated by booster circuitry 206 in order to verify the operability of the booster circuitry. This example is merely illustrative and, in general, the steps of FIG. 6 may be applied for verifying any desired transient signals in image sensor 16.

At step 602, booster circuitry 206 may transmit boosted signals (e.g. signals $V_{TRANS}$ as shown in FIG. 4) from to array 202. Signals $V_{TRANS}$ may be provided to monitoring circuitry 206 without interfering with the boosted signals provided to array 202.

At step 604, signal capturing circuitry 306 may capture and store the received boosted signals in response to receiving a corresponding booster sample enable signal (e.g. signal ph2 in FIG. 5).

At step 606, level shifting and compressing circuitry 308 may perform compression and/or shifting of the voltage levels of the captured signal to generate adjusted signals (e.g., level shifted and/or compressed signals). For example, circuitry 308 may be controlled using control signals of the type shown in FIG. 5 to perform level shifting and compression. Circuitry 304 may provide the adjusted signals to converting circuitry 310. At step 608, converting circuitry 310 may perform conversion of the captured signal from an analog signal to a digital signal to generate digital data.

At step 610, converting circuitry 310 may provide the digital data to host circuitry (e.g. host circuitry 312 in FIG. 3) for processing. For example, host circuitry 312 may perform pass/fail testing on booster circuitry or voltage reference systems based on the received digital data (e.g., received digital versions of the transient signals implemented by sensor 16). By performing this verification it may be possible to proactively identify hardware failure or degradation before it can a negative impact the safety of the system or the user.

Figure 7:
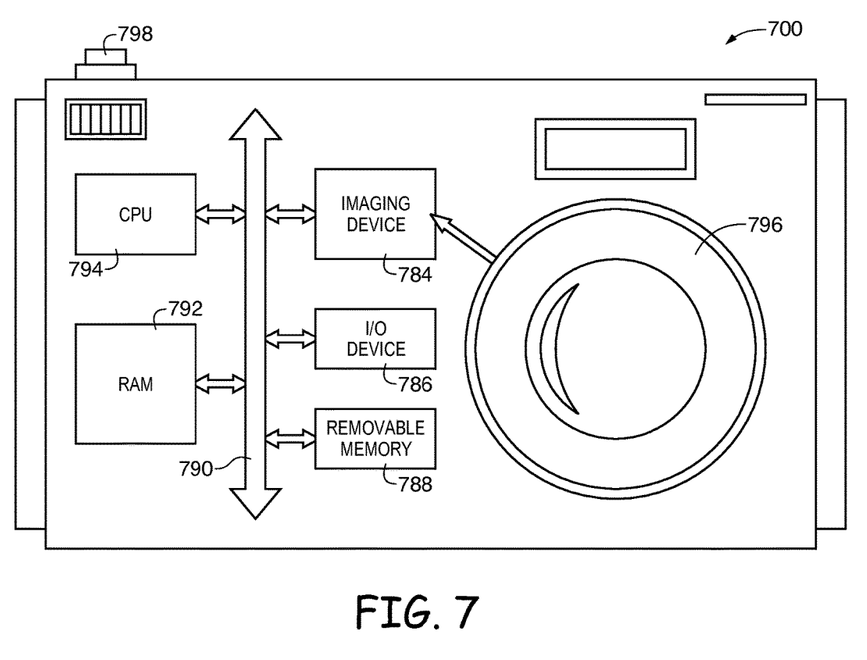
FIG. 7 is a block diagram of a processor system employing the image sensor of FIGS. 1-6 in accordance with an embodiment of the present invention.

FIG. 7 is a block diagram of a processor system employing the image sensor of FIG. 2 in accordance with an embodiment. Device 784 may comprise the elements of device 10 (FIG. 1) or any relevant subset of the elements. Processor system 700 is exemplary of a system having digital circuits that could include imaging device 784. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 700, which may be a digital still or video camera system, may include a lens or multiple lenses indicated by lens 796 for focusing an image onto an image sensor array or multiple image sensor arrays such as image sensor array 16 (FIG. 1) when shutter release button 798 is pressed. Processor system 700 may include a central processing unit such as central processing unit (CPU) 794. CPU 794 may be a microprocessor that controls camera functions and one or more image flow functions and communicates with one or more input/output (I/O) devices 786 over a bus such as bus 790. Imaging device 784 may also communicate with CPU 794 over bus 790. System 700 may include random access memory (RAM) 792 and removable memory 788. Removable memory 788 may include flash memory that communicates with CPU 794 over bus 790. Imaging device 784 may be combined with CPU 794, with or without memory storage, on a single integrated circuit or on a different chip. Although bus 790 is illustrated as a single bus, it may be one or more buses or bridges or other communication paths used to interconnect the system components.

Various embodiments have been described illustrating image sensor pixels that include circuitry configured to capture and adjust transient voltage signals within an imaging system. The imaging system may include an array of image sensor pixels, row control circuitry, column control and readout circuitry, transient signal monitoring circuitry, and converting circuitry. At least one of the row control circuitry and the column control and readout circuitry may be configured to generate transient voltage signals. The transient signal monitoring circuitry may be configured to capture, store, and perform level adjustment operations on the transient voltage signals to generate level adjusted transient voltage signals. The converting circuitry may perform analog-to-digital conversion on the level adjusted transient voltage signals. The converting circuitry may be configured to transmit level adjusted transient voltage signals to host circuitry for processing.

In one embodiment, the row control circuitry may include booster circuitry configured to adjust control signal voltage levels for each row in the array of image sensor pixels. The transient voltage signals may be generated by the booster circuitry. In another embodiment, the converting circuitry may include a column analog-to-digital converter circuit that may be coupled between the image pixel array and the column control and readout circuitry. An output of the transient signal monitoring circuitry may be coupled to the converting circuitry.

In yet another embodiment, the transient signal monitoring circuitry may include signal capturing circuitry and level shifting and compressing circuitry. The signal capturing circuitry may be configured to receive and store at least one of the generated transient voltage signals. The level shifting and compressing circuitry may be configured to perform at least one of level shifting and compression operations on the at least one stored transient voltage signal to generate the level adjusted transient voltage signals. The generated transient voltage signals may comprise a plurality of different transient voltage signals and the signal capturing circuitry may be configured to receive and store each of the plurality of different transient voltage signals. The level shifting and compressing circuitry may include a corresponding level shifting and compressing circuit that is configured to perform at least one of the level shifting and compression operations on each respective transient voltage signal of the stored plurality of different transient voltage signals. The level shifting and compressing circuit may include first and second capacitors and a reference voltage signal input and may be configured to perform at least one of the level shifting and compression operations based on a magnitude of the reference voltage signal input and a capacitance ratio of the first and second capacitors. The level shifting and compressing circuitry may include multiplexing circuitry that routes each of the plurality of different transient voltage signals through a common buffer circuit.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
an array of image sensor pixels;
row control circuitry comprising:
booster circuitry configured to generate transient voltage signals by adjusting voltage levels of row control signals for controlling individual rows of pixels in the array of image sensor pixels;
column control and readout circuitry;
transient signal monitoring circuitry that is configured to capture, store, and perform level adjustment operations on the transient voltage signals to generate level adjusted transient voltage signals; and
converting circuitry that performs analog-to-digital conversion on the level adjusted transient voltage signals.

2. The imaging system defined in claim 1, wherein the converting circuitry comprises a column analog-to-digital converter circuit that is interposed on a column readout line coupled to the image pixel array.

3. The imaging system defined in claim 2, wherein an output of the transient signal monitoring circuitry is coupled to the converting circuitry.

4. The imaging system defined in claim 1, wherein the transient signal monitoring circuitry further comprises:
signal capturing circuitry that is configured to receive and store at least one of the generated transient voltage signals; and
level shifting and compressing circuitry that is configured to perform at least one of level shifting and compression operations on the stored at least one transient voltage signal to generate the level adjusted transient voltage signals.

5. The imaging system defined in claim 4, wherein the generated transient voltage signals comprise a plurality of different transient voltage signals, wherein the signal capturing circuitry is further configured to receive and store each of the plurality of different transient voltage signals, and wherein the level shifting and compressing circuitry comprises a corresponding level shifting and compressing circuit that is configured to perform at least one of the level shifting and compression operations on each respective transient voltage signal of the stored plurality of different transient voltage signals.

6. The imaging system defined in claim 5, wherein the level shifting and compressing circuitry further comprises:
multiplexing circuitry that routes each of the plurality of different transient voltage signals through a common buffer circuit interposed between the level shifting and compressing circuitry and the converting circuitry.

7. The imaging system defined in claim 5, wherein the level shifting and compressing circuit further comprises:
first and second capacitors; and
a reference voltage signal input.

8. The imaging system defined in claim 7, wherein the level shifting and compressing circuit is further configured to perform at least one of the level shifting and compression operations based on a magnitude of the reference voltage signal input and a capacitance ratio of the first and second capacitors.

9. A system, comprising:
a central processing unit;
memory;
a lens;
input-output circuitry; and
an imaging device, wherein the imaging device comprises:
an image pixel array arranged in rows and columns;
row control circuitry;
column control and readout circuitry;
booster circuitry that is configured to adjust row control signal voltage levels for the rows of the image pixel array to generate booster signals;
transient signal monitoring circuitry that is configured to capture, store, and perform level adjustment operations on the booster signals to generate level adjusted booster signals; and
converting circuitry that performs analog-to-conversion on the level adjusted booster signals.

10. The system defined in claim 9, wherein the transient signal monitoring circuitry further comprises:
signal capturing circuitry that is configure to receive and store the generated booster signals; and
level shifting and compressing circuitry that is configured to perform at least one of level shifting and compression operations on the stored booster signals to generate the level adjusted booster signals.

11. The system defined in claim 10, wherein the generated booster signals comprises a plurality of different booster signals, wherein the signal capturing circuitry is further configured to receive and store each of the plurality of different booster signals, and wherein the level shifting and compressing circuitry comprises a corresponding level shifting and compressing circuit that is configured to perform at least one of the level shifting and compression operations on each respective booster signal of the stored plurality of different transient voltage signals.

12. The system defined in claim 11, wherein the level shifting and compressing circuit further comprises:
first and second capacitors; and
a reference voltage signal input.

13. The system defined in claim 12, wherein the level shifting and compressing circuit is further configured to perform at least one of the level shifting and compression operations based on the magnitude of the reference voltage signal input and a capacitance ratio of the first and second capacitors.

14. An imaging system comprising:
   booster circuitry that generates a boosted row control signal for controlling a row of image sensor pixels;
   signal capturing circuitry that captures and stores the boosted row control signal;
   level shifting and compressing circuitry that performs at least one of compression and level shifting operations on the captured and stored boosted row control signal; and
   converting circuitry that converts the boosted row control signal from an analog signal to a digital signal.

15. The imaging system defined in claim 14, wherein the signal capturing circuitry captures and stores the boosted row control signal in response to receiving a booster sample enable signal at the signal capturing circuitry.

16. The imaging system defined in claim 14, wherein the level shifting and compressing circuitry comprises first and second capacitors, and wherein the level shifting and compressing circuitry compresses the boosted row control signal by a capacitance ratio of the first and second capacitors.

17. The imaging system defined in claim 16, wherein the level shifting and compressing circuitry level shifts the boosted row control signal to a predetermined offset magnitude based on a reference voltage signal.

18. The imaging system defined in claim 14, wherein the converting circuitry transmits the converted boosted row control signal to host circuitry for processing.

* * * * *